United States Patent
Kanie et al.

(10) Patent No.: US 8,087,916 B2
(45) Date of Patent: Jan. 3, 2012

(54) HOLDING JIG FOR A FOAMABLE MATERIAL

(75) Inventors: Hideki Kanie, Nisshin (JP); Masahiko Koumura, Toyokawa (JP)

(73) Assignee: Cemedine Henkel Co., Ltd., Tokyo (JP)

( * ) Notice: Subject to any disclaimer, the term of this patent is extended or adjusted under 35 U.S.C. 154(b) by 918 days.

(21) Appl. No.: 11/304,213

(22) Filed: Dec. 15, 2005

(65) Prior Publication Data

US 2007/0138683 A1    Jun. 21, 2007

(51) Int. Cl.
*B29C 39/10* (2006.01)

(52) U.S. Cl. .............. 425/4 R; 425/817 R; 425/117; 425/145; 425/256; 425/382 N; 249/63; 249/91; 249/96; 264/46.5; 264/46.6; 264/273

(58) Field of Classification Search .............. 425/130, 425/257, 382 R, 382.2, 382 N, 462, 463, 425/4 R, 110, 117, 125, 127, 145, 256, 817 R; 249/63, 91, 96; 264/46.5, 46.6, 273
See application file for complete search history.

(56) References Cited

U.S. PATENT DOCUMENTS

| | | | | |
|---|---|---|---|---|
| 3,403,486 A | * | 10/1968 | Schubeis | 52/127.2 |
| 3,930,771 A | * | 1/1976 | Meyn | 425/129.1 |
| 4,082,825 A | * | 4/1978 | Puterbaugh | 264/46.5 |
| 4,495,240 A | * | 1/1985 | McCarthy | 428/319.1 |
| 4,734,317 A | * | 3/1988 | Sato et al. | 428/317.3 |
| 4,751,249 A | * | 6/1988 | Wycech | 521/54 |
| 4,853,270 A | * | 8/1989 | Wycech | 428/68 |
| 5,089,311 A | | 2/1992 | Ligon, Sr. | |
| 5,102,188 A | * | 4/1992 | Yamane | 296/205 |
| 5,160,465 A | | 11/1992 | Soderberg | |
| 5,196,253 A | * | 3/1993 | Mueller et al. | 428/138 |
| 5,213,391 A | * | 5/1993 | Takagi | 296/205 |
| 5,331,065 A | | 7/1994 | Po' et al. | |
| 5,344,208 A | * | 9/1994 | Bien et al. | 296/187.02 |
| 5,506,025 A | | 4/1996 | Otto et al. | |
| 5,575,526 A | * | 11/1996 | Wycech | 296/205 |

(Continued)

FOREIGN PATENT DOCUMENTS

JP    10-071628    3/1998

(Continued)

*Primary Examiner* — Joseph Del Sole
*Assistant Examiner* — Seyed Masoud Malekzadeh
(74) *Attorney, Agent, or Firm* — Mary K. Cameron

(57) ABSTRACT

The invention provides a holding jig for supporting and fixing a solid material capable of being foamed by application of heat in a cavity of a hollow structure. The holding jig may be provided with a plate-like base body made smaller in diameter than the cavity of the hollow structure, a holding part that is provided in a predetermined width in the form of a ring on the periphery of one side of said base body and supports one side of the foamable material, a step part with predetermined height, which is projected in the form of a ring at the inner peripheral end of said holding part and supports the inner peripheral surface of the foamable material, and an attaching means with which the base body can be freely attached to or detached from the hollow structure. The holding part can be provided with a plurality of small holes that open from one side to the other side of the base body, preferably in a net or lattice pattern. The holding jig may have one or more extensions containing approximately U-shaped foaming control walls that assist in directing expansion of the foaming material towards corners of the hollow structure.

13 Claims, 15 Drawing Sheets

U.S. PATENT DOCUMENTS

| | | | |
|---|---|---|---|
| 5,631,027 A * | 5/1997 | Takabatake | 425/4 R |
| 5,642,914 A * | 7/1997 | Takabatake | 296/187.02 |
| 5,649,400 A * | 7/1997 | Miwa | 52/406.1 |
| 5,678,826 A | 10/1997 | Miller | |
| 5,755,486 A * | 5/1998 | Wycech | 296/187.02 |
| 5,766,719 A | 6/1998 | Rimkus | |
| 5,806,915 A | 9/1998 | Takabatake | |
| 5,806,919 A | 9/1998 | Davies | |
| 5,888,600 A * | 3/1999 | Wycech | 428/35.9 |
| 5,904,024 A * | 5/1999 | Miwa | 52/309.1 |
| 5,931,474 A | 8/1999 | Chang et al. | |
| 5,979,902 A | 11/1999 | Chang et al. | |
| 6,050,630 A * | 4/2000 | Hochet | 296/193.07 |
| 6,062,624 A | 5/2000 | Crabtree et al. | |
| 6,093,358 A | 7/2000 | Schiewe et al. | |
| 6,114,004 A | 9/2000 | Cydzik et al. | |
| 6,135,542 A * | 10/2000 | Emmelmann et al. | 296/205 |
| 6,146,565 A | 11/2000 | Keller | |
| 6,372,334 B1 * | 4/2002 | Wycech | 428/316.6 |
| 6,382,635 B1 * | 5/2002 | Fitzgerald | 277/630 |
| 6,413,611 B1 * | 7/2002 | Roberts et al. | 428/99 |
| 6,474,722 B2 * | 11/2002 | Barz | 296/187.02 |
| 6,607,238 B2 * | 8/2003 | Barz | 296/187.09 |
| 6,619,009 B2 * | 9/2003 | Lupini et al. | 52/574 |
| 6,619,727 B1 * | 9/2003 | Barz et al. | 296/187.02 |
| 6,641,208 B2 * | 11/2003 | Czaplicki et al. | 296/187.02 |
| 6,649,243 B2 | 11/2003 | Roberts et al. | |
| 6,820,923 B1 * | 11/2004 | Bock | 296/187.02 |
| 6,926,784 B2 * | 8/2005 | Bock | 156/78 |
| 6,928,736 B2 * | 8/2005 | Czaplicki et al. | 29/897.2 |
| 7,077,460 B2 * | 7/2006 | Czaplicki et al. | 296/187.02 |
| 7,097,794 B2 * | 8/2006 | McLeod et al. | 264/46.5 |
| 7,249,415 B2 * | 7/2007 | Larsen et al. | 29/897.2 |
| 2004/0239148 A1 | 12/2004 | Ratet | |
| 2005/0012280 A1 * | 1/2005 | Richardson | 277/628 |
| 2005/0082111 A1 | 4/2005 | Weber | |
| 2005/0194706 A1 * | 9/2005 | Kosal et al. | 264/46.5 |
| 2005/0279567 A1 | 12/2005 | Ito | |

FOREIGN PATENT DOCUMENTS

| | | |
|---|---|---|
| JP | 10-291220 | 12/1998 |
| JP | 10-323911 | 12/1998 |
| JP | 2999361 | 5/1999 |
| JP | 2954499 | 7/1999 |
| JP | 11-226971 | 8/1999 |
| JP | 11-254462 | 9/1999 |
| JP | 11-254571 | 9/1999 |
| JP | 2001-341592 | 12/2001 |
| JP | 2003-146243 | 5/2003 |
| JP | 2004-004445 | 1/2004 |
| JP | 2004-230834 | 8/2004 |
| JP | 2004-252169 | 9/2004 |
| WO | WO 00/27920 | 5/2000 |
| WO | WO 01/19667 | 3/2001 |
| WO | WO 01/71225 | 9/2001 |
| WO | WO 01/92063 A1 | 12/2001 |

* cited by examiner

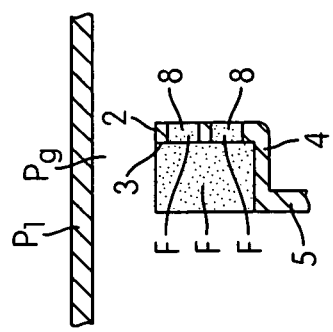
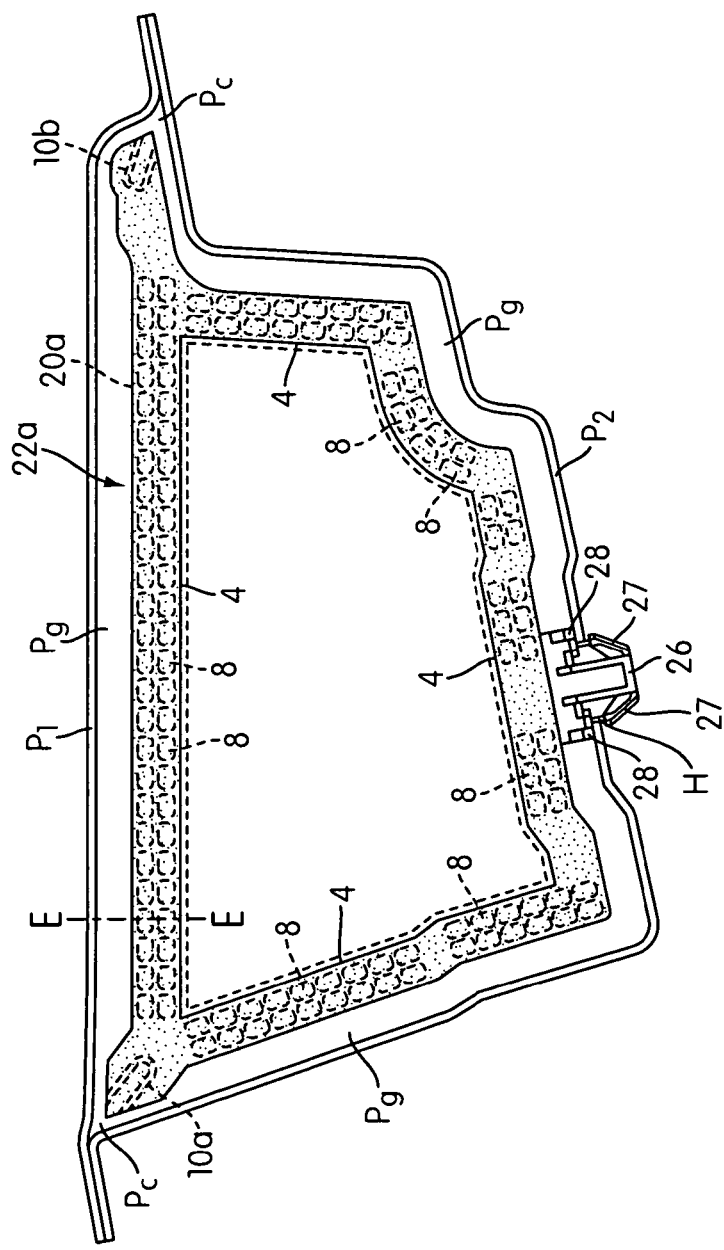
FIG. 9b
FIG. 9a

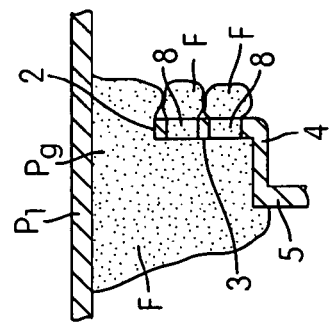
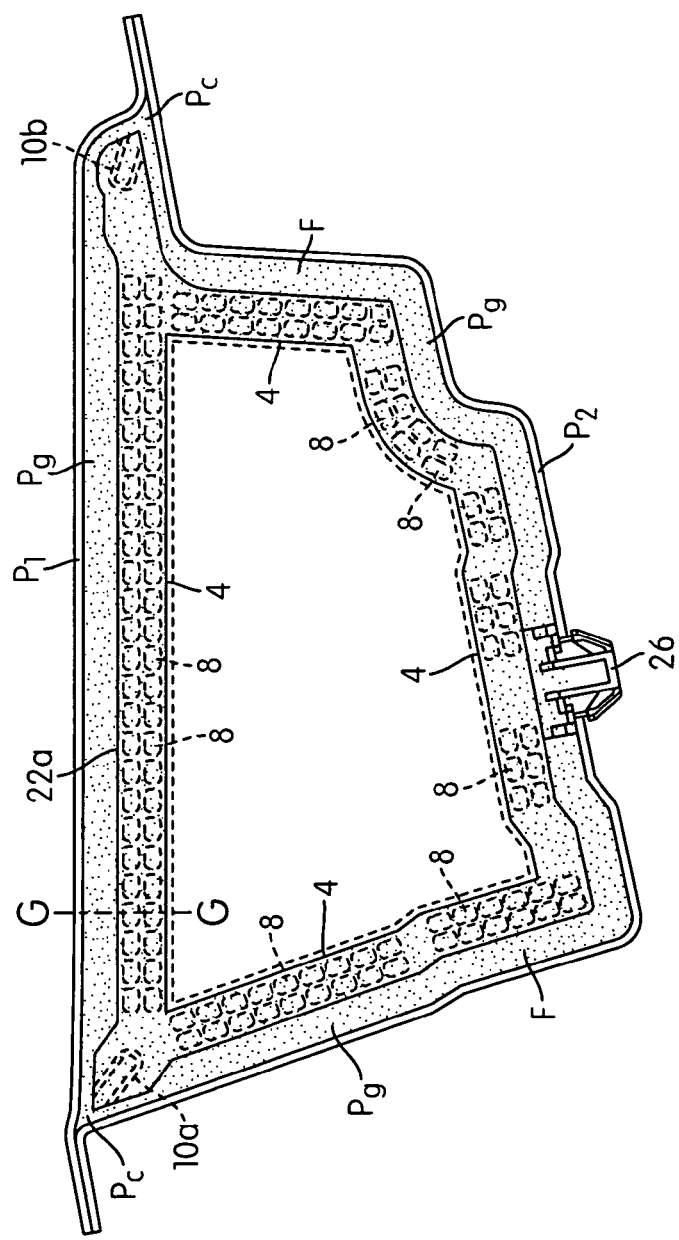

HOLDING JIG FOR A FOAMABLE MATERIAL

FIELD OF THE INVENTION

The present invention pertains to a holding jig (also called a holder or carrier) for supporting and fixing a foamable material that is used to fill a cavity (also called a hollow space) of a hollow structure such as a pillar, rocker panel, or roof side panel of an automobile body and that is intended to fill up the cavity by foaming and expanding upon external heating, and to cavity fillers (also called hollow space blocking parts or baffles) and auxiliary cavity fillers for a hollow structure utilizing said holding jig.

DISCUSSION OF THE RELATED ART

Ordinarily, a foamable material is used to fill a cavity of a hollow structure such as a pillar of an automobile body, where this material foams and expands upon applying external heat of about 140-210° C. to the automobile body in the electrodeposition or baked finish process of the automobile, and has soundproofing and vibration damping effects such as improving the quietness within the car by blocking the transmission of road noise and wind noise during driving through cavities in the frame of the automobile body. Foamable materials are also commonly used to strengthen or stiffen vehicle cavities and the like (i.e., for structural reinforcement purposes).

This foamable material must be supported and fixed for a fixed length of time at predetermined sites in a cavity of a hollow structure until it foams and expands due to external heat, and various types of holding jigs for this purpose and ways of cavity filler that make use of these jigs have been proposed, but the following problems exist.

Generally, the holding jigs and foamable materials are made of materials of very different properties, materials for the former being metals or heat-resistant hard synthetic resins, and materials for the latter being mixtures of heat-foaming materials such as urethane-, epoxy-, rubber-, or olefin-based materials and fillers (filler materials). Because of this, there is no adhesion between the two when they are simply stacked, and the foamable material drops very easily from the holding jig; consequently, means to prevent this dropping are needed, and various proposals have been made, such as providing holding pieces at both ends of a holder (holding jig) so as to attach a foamable material to the holder (as exemplified by Japanese Laid Open Application No. 11[1999]-254,462), or inserting retaining tacks of a holder into retaining holes provided in a foamable material, so as to fix the two (as exemplified by Japanese Laid Open Application No. 2003-146,243), but there are drawbacks in terms of cost and weight reduction, because of the increased number of parts needed such as the holding pieces (retaining tacks) and because of complicated fabrication, and also the foamable material separates away from the holding jig in those areas with no holding pieces (retaining tacks), thus the foaming and expanding direction is not suitably controlled and the filler of a cavity may not be satisfactorily completed.

Also known are holders with a sandwich structure (as exemplified by Japanese Patent No. 2,999,361; Japanese Patent No. 2,954,499; and Japanese Laid Open Application No. 11[1999]-226,971), in which a foamable material is placed between plate-shaped control means in order to control the foaming process in the longitudinal direction of a cavity filled with a foamable material and to permit foaming expansion in the transverse cross-sectional direction, but the number of parts may be extensive and in addition there is a drawback in that the cost of a mold increases because so-called undercutting is needed during molding and thus a slide core is required for the mold, if such a structure as mentioned above is to be adopted even in part to control foaming in the longitudinal direction of a cavity from both sides with a holding jig that is formed as one integral piece. Furthermore, a problem arises in productivity, because the slide core must be set up and thus the area available for "gouging" a mold is reduced, thus the number of molds prepared in this way cannot easily be increased.

Furthermore, the above-mentioned holding jig consists basically of plate-shaped members in the area that comes into contact with the foamable material, and heat from the outside is blocked when the plate-shaped members are made of a heat-resistant hard synthetic resin or the like; thus, heat is not transmitted easily to the foamable material located on the sides in contact with the plate-shaped members or inner periphery, and foaming and expansion of the foamable material by external heat may thus be inadequate, and furthermore an extra amount of the foamable material may be needed when areas of insufficient foaming are taken into account.

There is also another proposed design where receiving steps and projected rims are provided on the periphery of the base body material of a holding jig, and the projected rims are covered with foamable material, to support the foamable material. However, some scheme such as forming a thick part at the leading end of the projected rim is needed in order to prevent the foamable material from easily separating from the holding jig. Additionally, there is not only a fabrication difficulty when covering the projected rims with the foamable material but there is also a danger that the projected rims will be deformed under molding pressure during fabrication, and if the projected rims are deformed, the covering of the projected rims with the foamable material will not be complete. This not only looks bad but may also reduce the filler efficiency in the cavity; the stability of production, such as in the quality and yield, thus is badly affected. Also, in order to be ejected or removed from the mold, the molded product must be pushed out with an ejector pin, but if the projected rims are covered with the foamable material, the ejector pin will dig into the foamable material unless the foamable material is completely cooled; thus, there is a problem in that productivity does not improve due to the need for increased cooling time, and thus a longer molding cycle.

Furthermore, a hollow structure such as a pillar is generally constructed by combining two or more side sheets, and the transverse cross-sectional shape of its cavity has corners where the side sheets are joined. Since these corners are often narrow and complicated, simply foaming and expanding the foamable material in the central area of the cavity is not enough to fill these corners adequately.

BRIEF SUMMARY OF THE INVENTION

The present invention was developed in view of the above-mentioned problems and is aimed at providing a holding jig for a foamable material and related means of a cavity filler and an auxiliary cavity filler for a hollow structure. Separation of the foamable material from the holding jig can be prevented without using members such as holding pieces or retaining tacks. The holding jig permits the attainment of high cavity filler efficiency by promoting adequate foaming and expansion of the foamable material, with good heat receiving efficiencies of the sides in contact with the holding jig and of the inner peripheral area. Moreover, uniform products can be produced in a stable manner and in good yield. In addition, the holding jig of the present invention enables the foamable material to expand adequately even into the corners of the transverse cross-sectional shape of the cavity while at the same time reducing the total amount of foamable material required as compared to previously known holding jig designs.

To solve one or more of the above-mentioned problems, the holding jig for a foamable material of the present invention is a holding jig (20) for supporting and fixing a solid foamable material (F) capable of being foamed when heated in a cavity of a hollow structure, characterized in that said holding jig (20) is provided with a plate-like base body (2) that is smaller in diameter than the cavity of the hollow structure, a holding part (3) that is provided in a predetermined width in the form of a ring on the periphery of one side of said base body (2) and that supports one side of the foamable material, a step part (4) of predetermined height that protrudes in the form of a ring at the inner peripheral end of said holding part (3) and that supports the inner peripheral surface of the foamable material, and an attaching means (6 or 26) to attach and fix said base body (2) to the hollow structure, and in that said holding part (3) is provided with a large number of holes (8) that are open from one side to the other side of the base body (2), preferably in a net or lattice pattern. The plate-like base body is substantially flat or planar in general shape, such that its average height, width and diameter are all greater than its maximum width. The plate-like base body may alternatively be described as a relatively thin support plate.

In another embodiment of the invention, the holding jig is provided with a plate-like base body (2) that is smaller in diameter than the cavity of the hollow structure and an attaching means to attach and fix said base body to a hollow structure, wherein said base body is provided with one or more extensions and with approximately U-shaped foaming control walls at the leading ends of said extensions.

In still another embodiment of the invention, the holding jig is provided with a plate-like base body (2) that is smaller in diameter than the cavity of the hollow structure and an attaching means to attach and fix said base body to the hollow structure, wherein said plate-like base body contains a plurality of holes around the periphery of said plate-like base body that are open from one side to the other side of the plate-like base body, with at least a portion of said holes having diameters that are smaller on one side of the plate-like base body than the other side of the plate-like base body. The foamable material present in such holes thereby effectively holds the foamable material in place on the periphery of the plate-like base body.

BRIEF DESCRIPTION OF THE DRAWINGS

FIG. 9 shows one embodiment of a cavity filler of the present invention attached in the cavity of a hollow structure, (a) being an illustration of the attached state, and (b) a cross-sectional view along line E-E.

FIG. 10 shows a cavity filler of the present invention foamed and expanded by external heat after being attached in the cavity of a hollow structure, (a) being an illustration of the foamed state, and (b) a cross-sectional view along line G-G.

DETAILED DESCRIPTION OF CERTAIN EMBODIMENTS OF THE INVENTION

Figure 1:
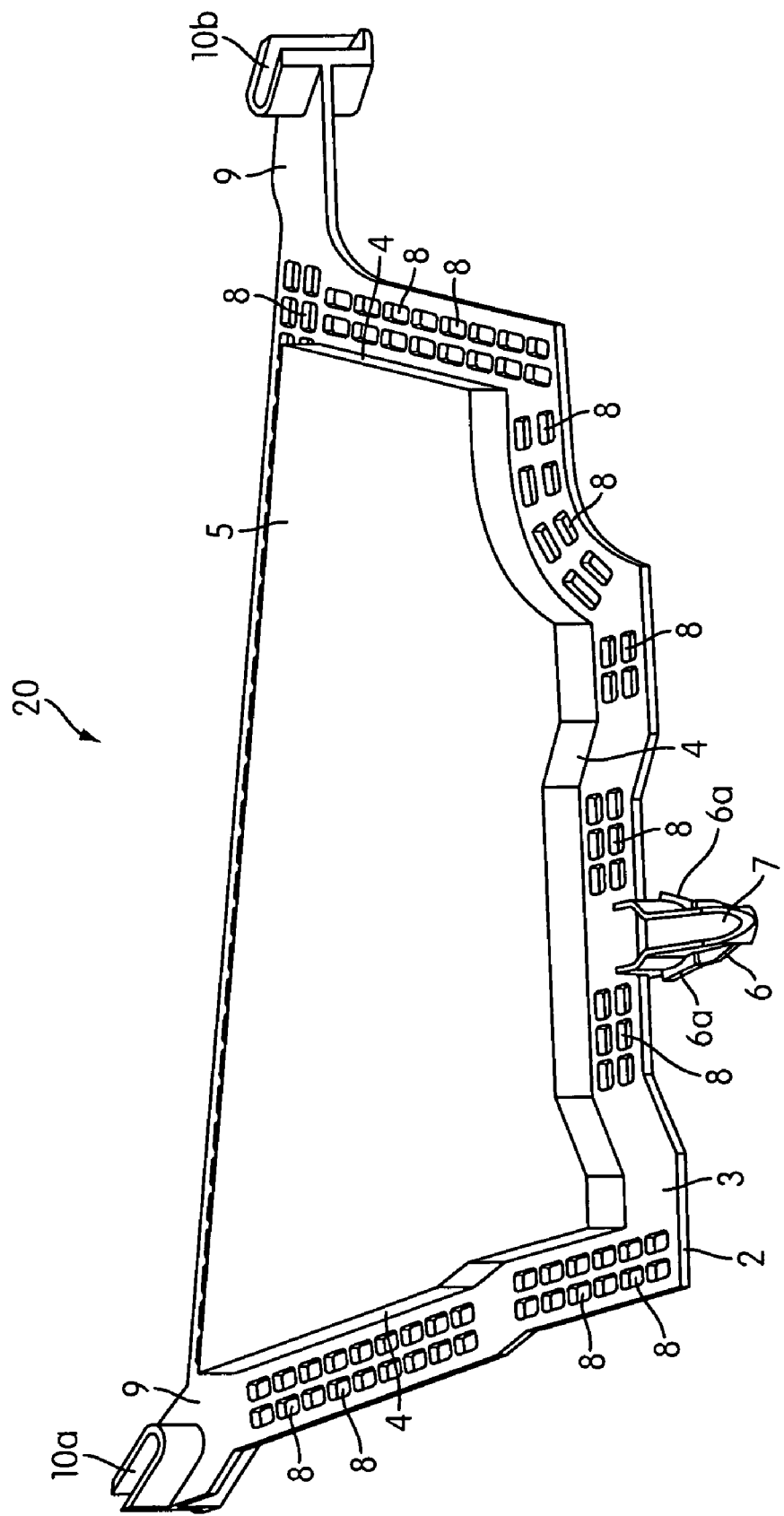
FIG. 1 is a front-side oblique diagram where the front side of one example of a holding jig of the present invention is shown in oblique view.

According to one embodiment of the present invention, the holding part (3) of the base body (2) is prepared with a large number of holes (8) that are preferably small and opened in a net or lattice pattern, and thereby a structure is prepared such that even the foamable material (F) in direct contact with the holding part (3) of the base body (2) can be directly heated without the heating from the outside being blocked by the base body (2), the heat-receiving efficiency is improved, and the foaming expansion efficiency of the foamable material is enhanced, so that good filler efficiency can be displayed within the cavity of the hollow structure.

When there are one or more corners in the transverse cross-sectional shape of the cavity of the hollow structure, it is desirable to provide one or more extensions (9) in the aforesaid base body (2) which correspond to the corners of the cavity of the hollow structure, and to provide approximately U-shaped foaming control walls (10) at the leading ends of said extensions (9), which are open at one or both ends in the longitudinal direction of the cavity and which are open toward said corners. "Approximately U-shaped" includes not only foaming control walls that define a space that is shaped like the letter "U" but also foaming control walls that in cross-section define open-ended spaces that are square, rectangular, circular, parabolic, polygonal or oval in shape as well as spaces shaped like the letter "V". Preferably, the ends of such spaces that are open toward the corners are not narrower in width than the maximum width within the approximately U-shaped space. Also preferably, the ends of such spaces that face in the direction opposite the corners are closed. The approximately U-shaped space in the assembled holding jig is preferably filled with the foaming material, thereby serving as a reservoir of the foaming material that is available for expansion generally selectively in the direction of the corner of the hollow structure cavity towards which the extension is directed. By providing such foaming control walls (10), the foamable material once activated and expanded can be packed adequately into the corners of the transverse cross-sectional shape of the cavity of the hollow structure. This arrangement of extensions having approximately U-shaped foaming control walls may be utilized as a feature of other types of holding jigs for foamable material. That is, such extensions may be employed with holding jigs that do not have a holding part that is provided in a predetermined width in the form of a ring on the periphery of one side of the base body and that supports one side of the foamable material, a step part of predetermined height that protrudes in the form of a ring at the inner peripheral end of the holding part and that supports the inner peripheral surface of the foamable material. Further, such extensions having approximately U-shaped foaming control walls may be utilized in holding jigs having holding parts that do not contain a plurality of holes that are open from one side to the other side of the base body, but rely on some other means for securing the foamable material to the holding jig.

With the above-mentioned structure, the holding jig (20) of the present invention has no parts that restrain the foaming in the longitudinal direction of the cavity from both sides, and thus there are no parts that require undercutting. Accordingly, the mold costs less with no need for a slide core, and the number of molds being prepared can be increased. Furthermore, it has no parts such as projected rims, and is not designed to cover such projections with foamable material; thus, the mold can be ejected or removed without waiting until the foamable material cools completely, which shortens the molding cycle and improves productivity.

Another embodiment of the holding jig for a foamable material of the present invention is a holding jig (20) for supporting and fixing a solid foamable material (F) that has heat foamability in a cavity of a hollow structure, characterized in that said holding jig (20) is provided with a plate-like base body (2) that is smaller in diameter than the cavity of the hollow structure, a holding part (3) that is provided in a predetermined width in the form of a ring on the periphery of one side of said base body (2) and that supports one side of the foamable material, a step part (4) of predetermined height that protrudes in the form of a ring at the inner peripheral edge of said holding part (3) and that supports the inner peripheral surface of the foamable material, and an attaching means (6 or 26) to attach and fix said base body (2) to the hollow structure, and in that said base body (2) is provided with extensions (9) which correspond to the corners of the cavity of the hollow structure, with approximately U-shaped foaming control walls (10) at the leading ends of said extensions (9), which are open at one or both ends in the longitudinal direction of the cavity and which are open toward said corners.

A cavity filler for a hollow structure in accordance with the present invention may be obtained by molding a foamable material into solid form in the holding part (3) of the holding jig of the present invention. In the cavity filler (22) of the present invention, when the foamable material (F) foams due to external heat, said foamable material (F) foams and expands also through the large number of holes (8) that are preferably small and formed in a net or lattice pattern, since its holding part (3) is designed as mentioned above. Thus, the foaming expansion of the foamable material (F) is not inhibited in the longitudinal direction of the cavity, which differs from the conventional technique.

Furthermore, in a cavity filler (22) for a hollow structure of the present invention, the foamable material (F) may be packed in each of the large number of small holes as well when the foamable material (F) is molded, since its holding part (3) is designed as mentioned above. The holding jig (20) and foamable material (F) will be thereby be provided with extremely high adhesion for one another and become difficult to separate. Accordingly, special members like holding pieces (retaining tacks) to attach the foamable material (F) to the holding jig (20) or special fabrication are unnecessary, which differs from the conventional technique, which in turn contributes to weight reduction and cost reduction due to the decreased number of parts. Moreover, since there are no parts such as a projected rim in the periphery of the holding jig (20), there is no danger of the projected rims being deformed by the molding pressure during fabrication, thus an advantage is provided in terms of the stability of production, such as in the quality and yield.

When the cavity of the hollow structure is divided into two compartments by a partition, an auxiliary cavity filler may be employed in accordance with the present invention. Such an auxiliary cavity filler (52) is attached in the other compartment when the previously described cavity filler is attached in one compartment. The auxiliary cavity filler may be prepared by molding a foamable material into a solid shape in an auxiliary holding part (43) in an auxiliary holding jig (40). The auxiliary holding jig (40) is provided with a plate-like auxiliary base body (42) that is smaller in diameter than the cavity of said other compartment, an auxiliary holding part (43) for supporting one side of the foamable material, which is provided on one side of said auxiliary base body (42) and provided with a large number of small holes (48) that are open from one side to the other side, and a means to be attached (46) to attach and fix said auxiliary base body (42) to the attaching means (6 or 26) of the holding jig (20). The partition is interposed between the cavity filler and the auxiliary cavity filler (52). With this arrangement, the cavity can be filled with the foamable material (F), even when the cavity of a hollow structure is divided into two compartments by means of a partition.

Furthermore, when there is a corner in the above-mentioned other compartment, it is desirable to provide an extension (49) in the auxiliary base body (42), corresponding to the corner in said other compartment, and to provide an approximately U-shaped foaming control wall (50) at the leading end of said extension (49), which is open at one or both ends in the longitudinal direction of the cavity and opens toward said corner.

The present invention offers a great advantage in that it can provide a holding jig for a foamable material, cavity filler, and auxiliary cavity filler for a hollow structure, which can prevent the foamable material from separating from the holding jig without using members such as holding pieces or retaining tacks; which can display adequate cavity filler efficiency by promoting adequate foaming and expansion of the foamable material, with good heat receiving efficiencies of the sides in contact with the holding jig and of the inner peripheral area; and moreover which can produce uniform products in a stable manner and in good yield.

Embodiments of the present invention will be described below with reference to the attached figures; however, it goes without saying that the illustrated examples are shown only for purposes of illustration, and that it would be possible to make various modifications, without thereby departing from the technical concept of the present invention.

Figure 2:
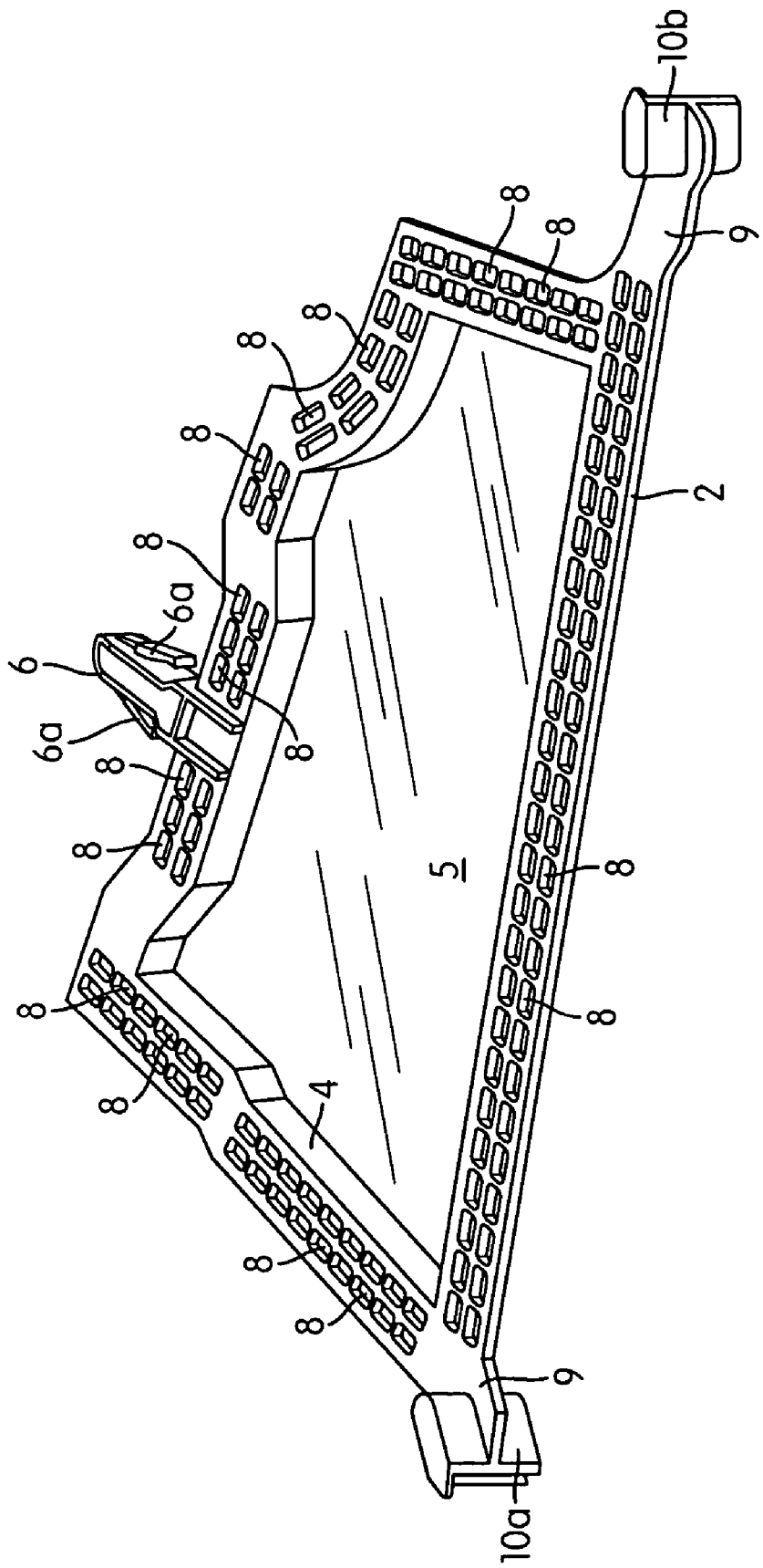
FIG. 2 is a back-side oblique diagram where the back side of one example of a holding jig of the present invention is shown in oblique view.
Figure 4:
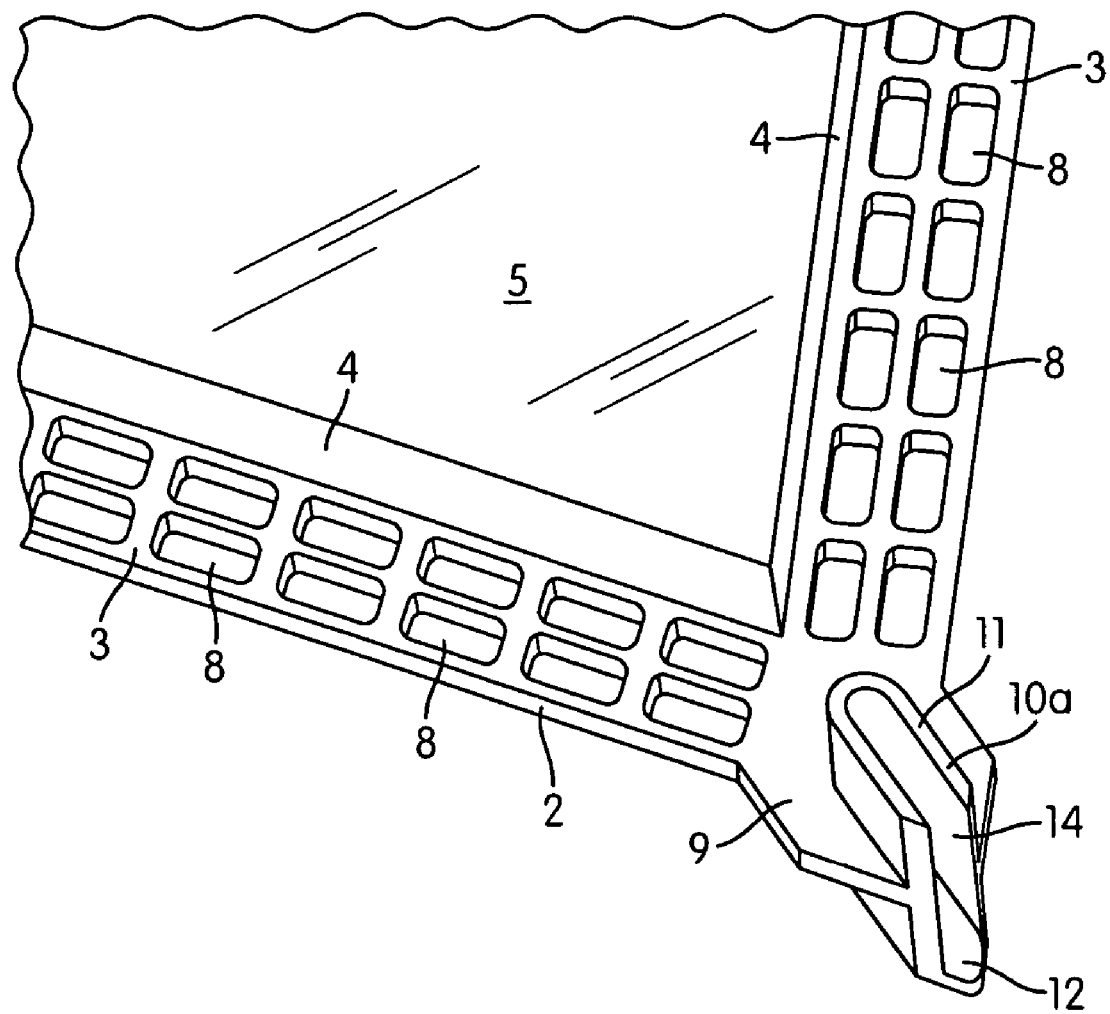
FIG. 4 is an enlarged oblique view of the key part, which shows, in enlargement, the U-shaped foaming control wall before the foamable material is molded onto the holding jig.
Figure 5:
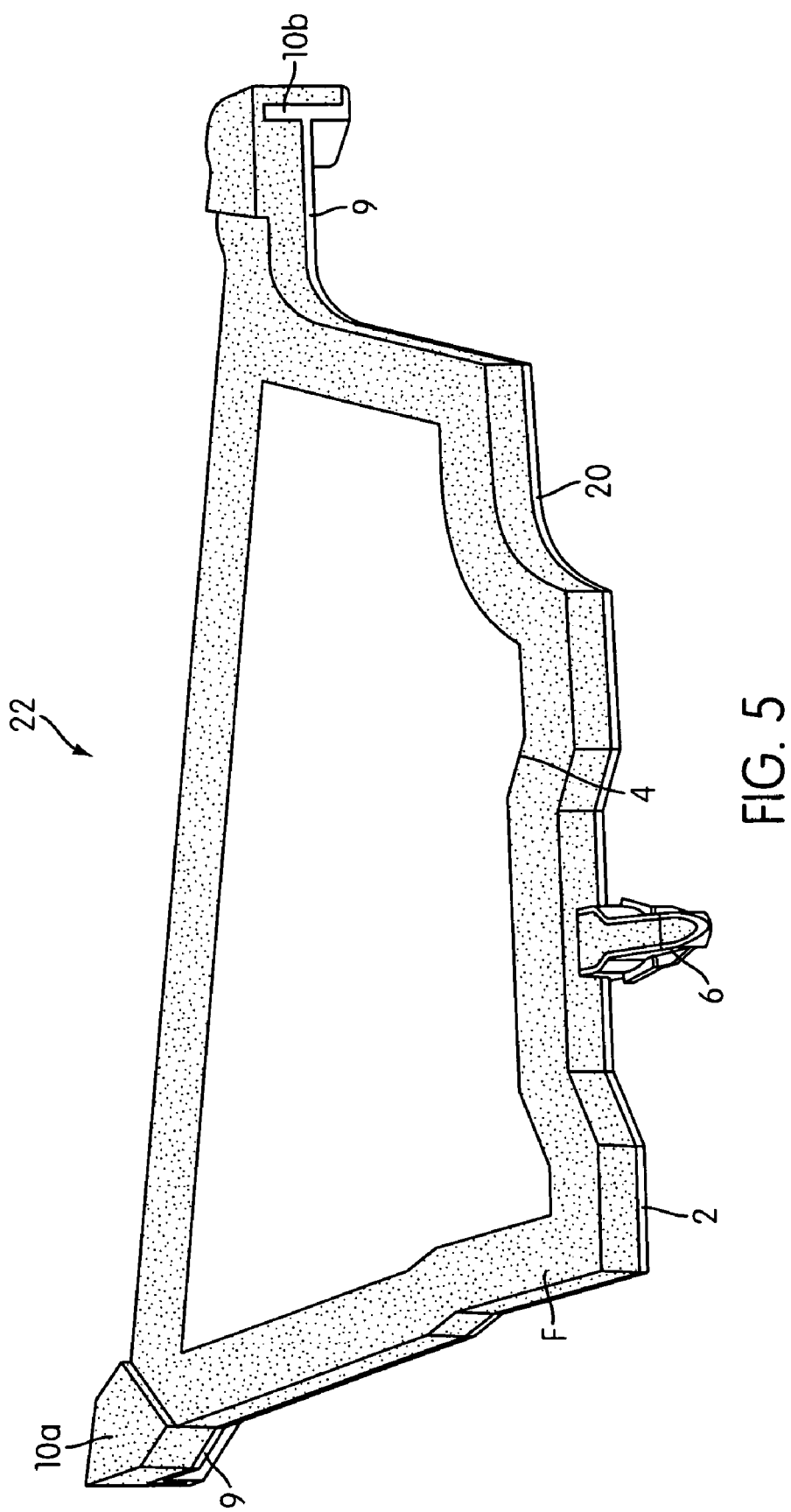
FIG. 5 is a front-side oblique diagram where the front side of one example of a cavity filler of the present invention is shown in oblique view.
Figure 6:
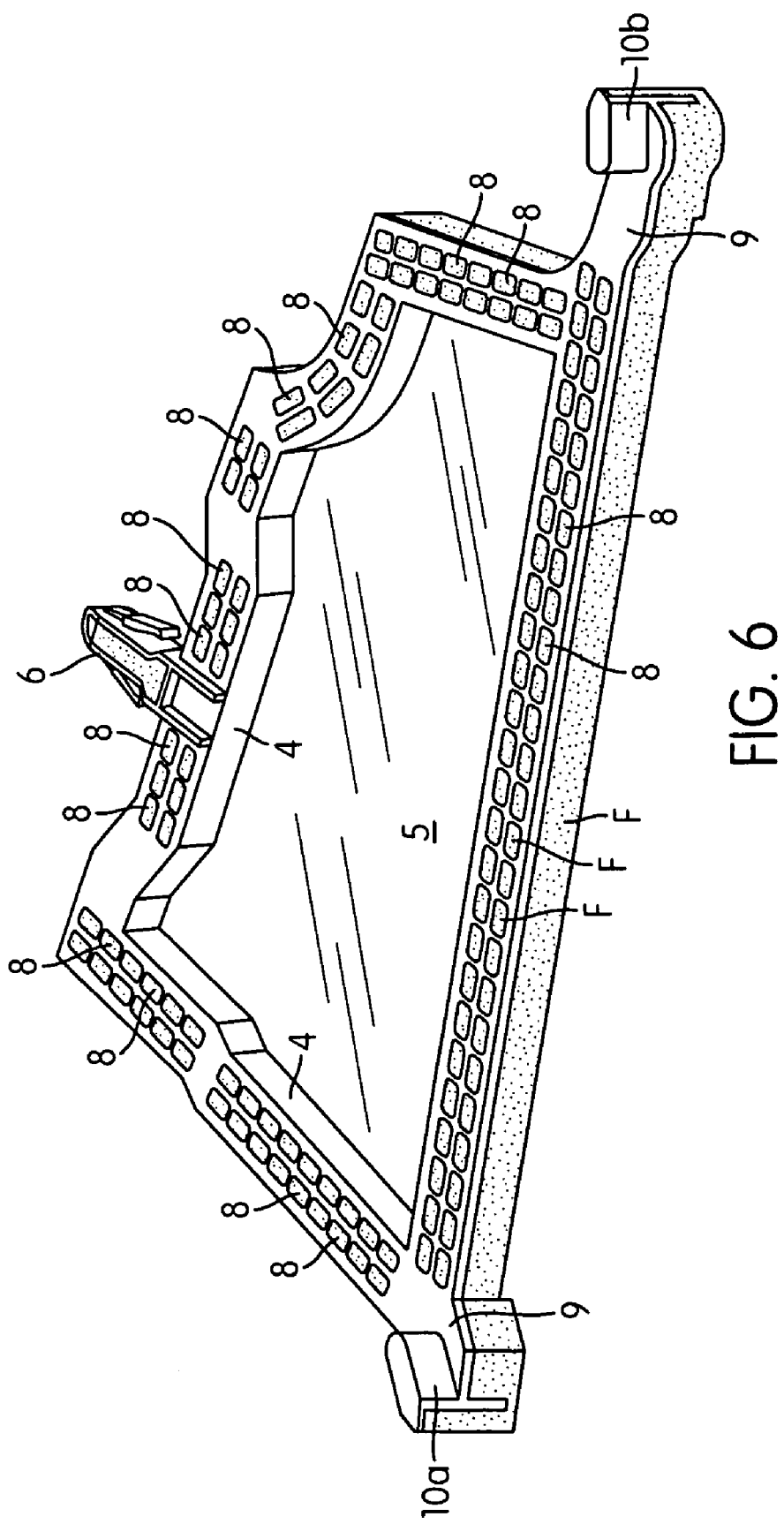
FIG. 6 is a back-side oblique diagram where the back side of one example of a cavity filler of the present invention is shown in oblique view.
Figure 7A:
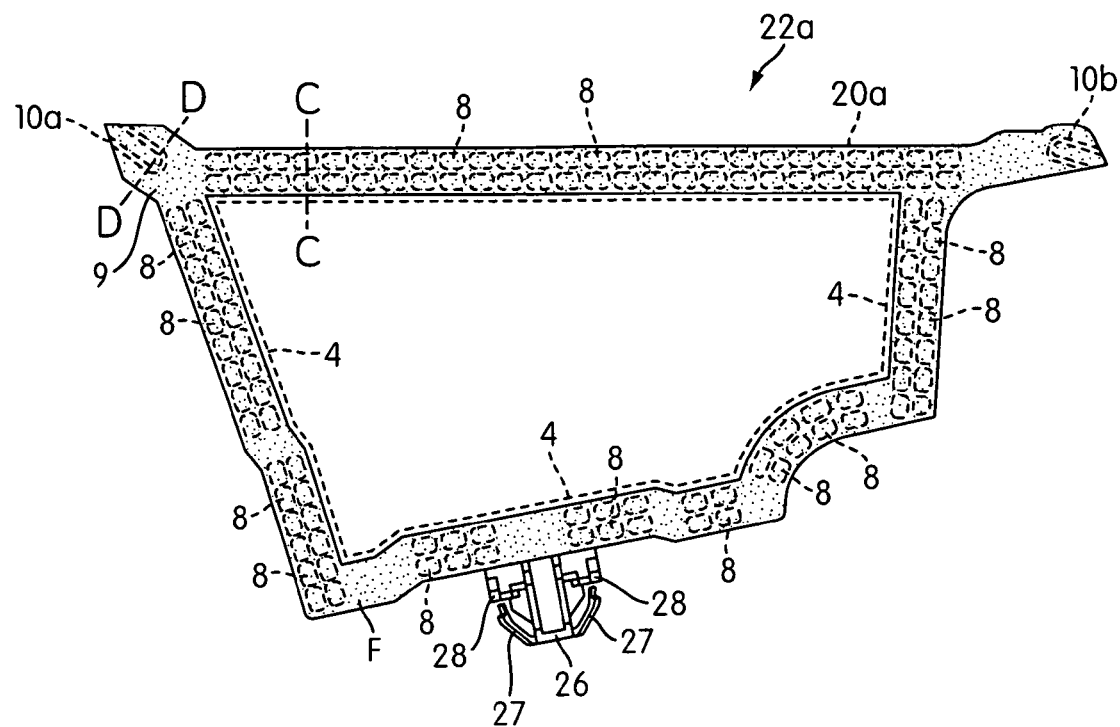
FIG. 7 presents diagrams of another example of a cavity filler of the present invention, (a) showing a top view, (b) a cross-sectional view along line C-C, and (c) a cross-sectional view along line D-D.
Figure 7B:
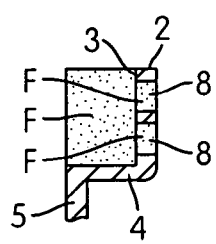
Figure 7C:
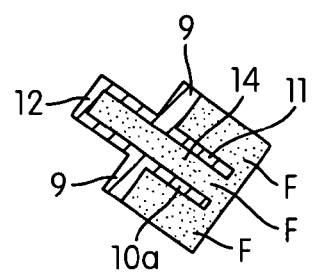
Figure 8:
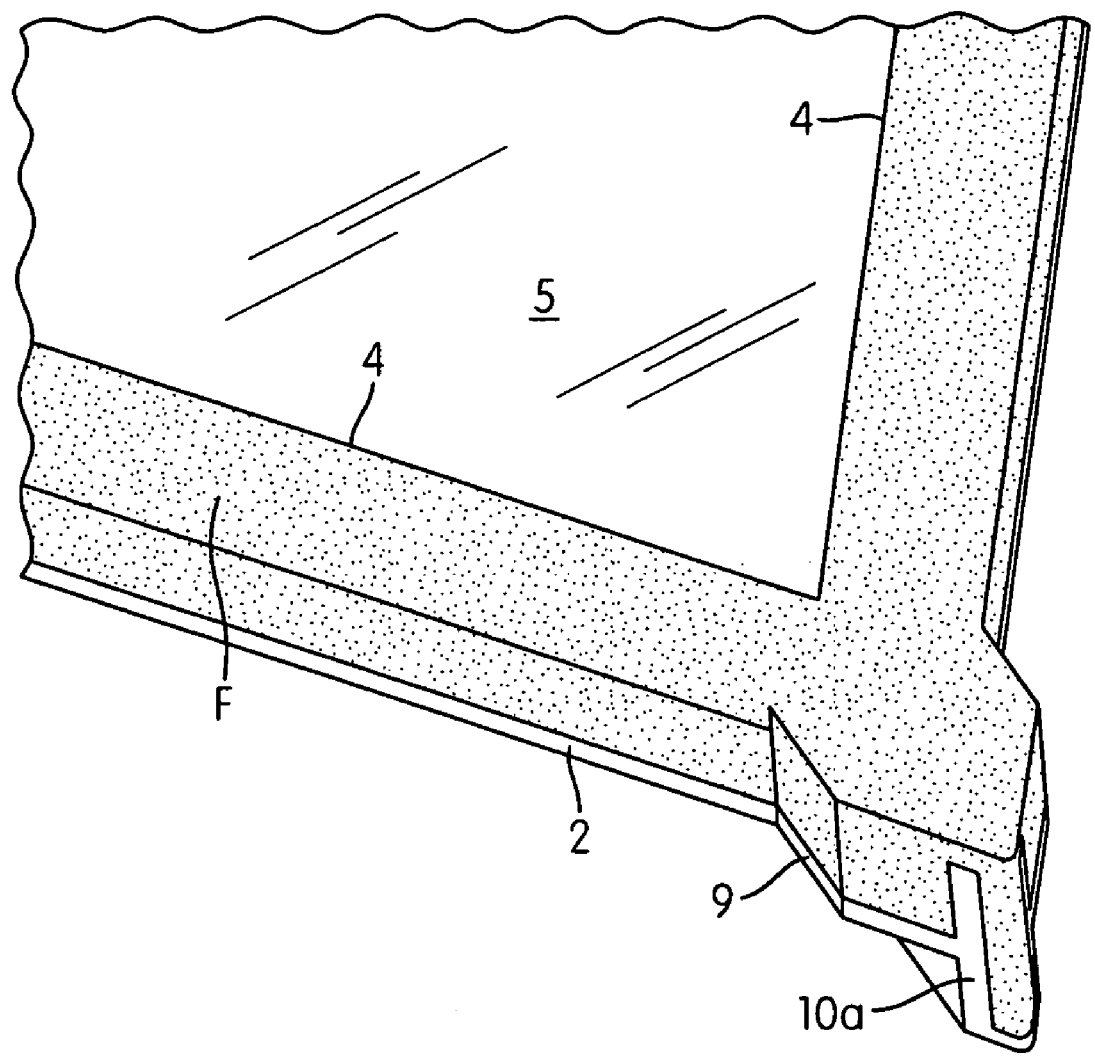
FIG. 8 is an enlarged oblique view of the key part, which shows, in enlargement, the U-shaped foaming control wall after the foamable material is molded.
Figure 14:
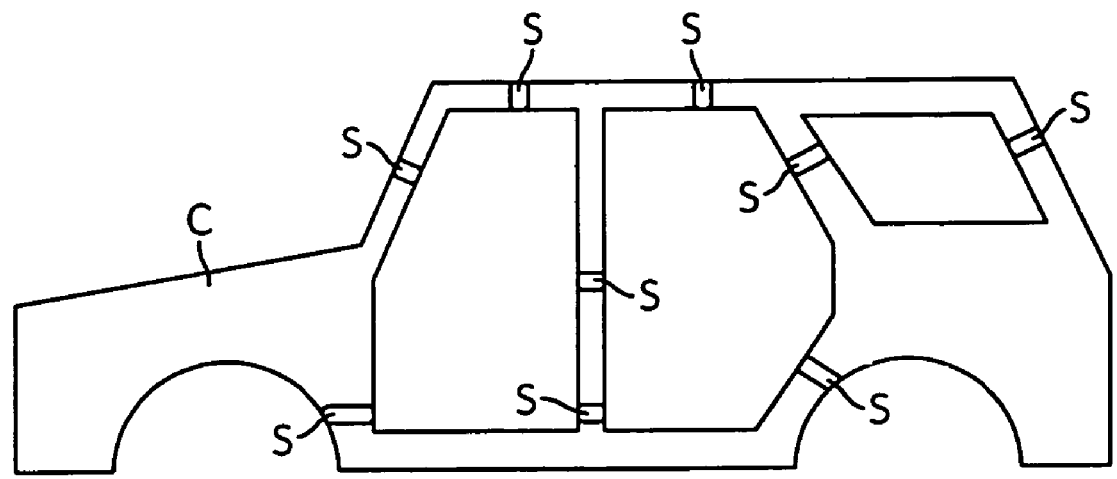
FIG. 14 is a schematic diagram that shows locations where cavity fillers can be attached in a station wagon.

First, the structures of a holding jig for a foamable material of the present invention and a cavity filler for a hollow structure of the present invention will be explained with reference to FIGS. 1-8. FIG. 1 is a front-side oblique view that shows the front side of one example of a holding jig of the present invention in oblique view. FIG. 2 is a back-side oblique view that shows the back side of one example of a holding jig of the present invention in oblique view. FIG. 3 shows another example of a holding jig of the present invention, (a) being a top-view illustration, (b) a cross-sectional view along line A-A, (c) a cross-sectional view along line B-B, and (d) an enlarged cross-sectional view of the key part, which shows one example of small holes (enlarged). FIG. 4 is an enlarged oblique view of the key part, which shows in enlargement an approximately U-shaped foaming control wall before a foamable material is molded onto the holding jig. FIG. 5 is a front-side oblique view that shows the front side of one example of a cavity filler of the present invention in oblique view. FIG. 6 is a back-side oblique view that shows the back side of one example of a cavity filler of the present invention in oblique view. FIG. 7 shows another example of a cavity filler of the present invention, (a) being a top view, (b) a cross-sectional view along line C-C, and (c) a cross-sectional view along line D-D. FIG. 8 is an enlarged oblique view of a key part, which shows in enlargement an approximately U-shaped foaming control wall after the foamable material is molded and placed onto the holding jig. In the figures, symbols (20) and (20a) represent holding jigs of the present invention, and symbols (22) and (22a) represent cavity fillers of the present invention. Furthermore, in FIG. 3 (another example of a holding jig of the present invention) and FIG. 7 (another example of a cavity filler of the present invention), only the attaching means are different and all the other parts are identical to those of one example of a holding jig of the present invention (FIGS. 1, 2, and 4) and one example of a cavity filler of the present invention (FIGS. 5, 6, and 8). Furthermore, the places where the cavity filler of the present invention may be placed are the same as with conventional cavity fillers, for example, the places indicated by symbol (S) in FIG. 14 in the case of a station wagon.

The holding jigs (20, 20a) are provided with a plate-like base body (2), and this base body (2) is to be installed in a cavity of a hollow structure such as a pillar of an automobile body and thus is made smaller in diameter than the transverse cross-sectional diameter of the cavity. The material of the base body (2) is not particularly critical, provided that it has heat resistance and some degree of hardness; for example, heat-resistant hard synthetic resins such as nylon can be used. Furthermore, when the base body (2) is made of a heat-resistant hard synthetic resin, a holding part (3), a step part (4), an attaching means (6), small holes (8), etc., as will be mentioned below are all formed as a one-piece structure in the base body (2).

In the base body (2), a holding part (3) to support one side of a foamable material (F) is formed, and this holding part (3) is provided in a predetermined width (for example, about 2-30 mm) in the form of a ring on the periphery of one side of the base body (2) (FIGS. 1 and 3).

Figure 3A:
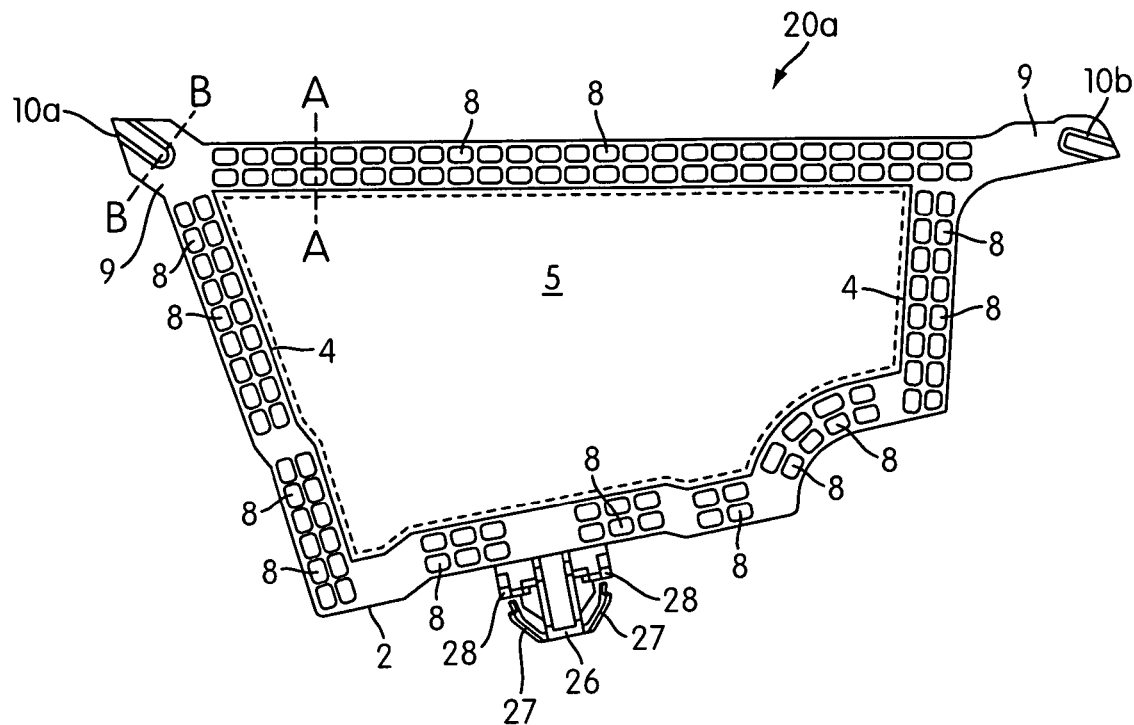
FIG. 3 presents diagrams of another example of a holding jig of the present invention, (a) showing a top-view illustration, (b) a cross-sectional view along line A-A, (c) a cross-sectional view along line B-B, and (d) an enlarged cross-sectional view of the key part, showing one example of small holes in enlargement.
Figure 3B:
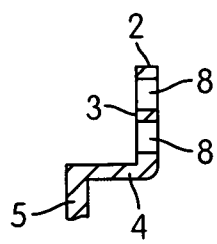
Figure 3C:
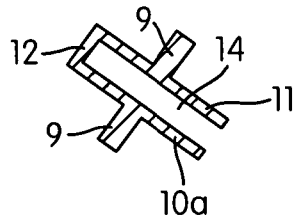

In the holding part (3) provided in the form of a ring on the periphery of one side of the base body (2), a large number of small holes (8) which open from one side (FIG. 1 side) of the base body (2) to the other side (FIG. 2 side) are present nearly all over the surface of the holding part (3) [refer to FIG. 3(b)], and are preferably formed in a mesh (net) or lattice pattern preferably over almost the entire surface of the holding part (3). (FIGS. 1-3). In one embodiment, at least about 25% of the surface of the holding part (3) is open in the form of holes. In another embodiment, at least about 40% of the surface of the holding part (3) is open in the form of holes. In the illustrated examples, the small holes (8) are approximately rectangular in shape when viewed from above, [FIG. 3(a)], but the shape is not particularly critical, and can be circular, oval, triangular or polygonal or any other form. The shape of the holes may be regular or irregular. Furthermore, the size of the small holes is not particularly critical, but is typically about 1-15 mm in diameter. The holding part (3) may contain holes of different sizes; alternatively, the holes may be uniform in size. Also, the holes may appear in a regular pattern (e.g., rows) on the surface of the holding part, but may also be distributed substantially randomly on said surface. For example, the holes may be arranged in two or more rows. The surface of the holding part may contain some regions in which no holes appear, as illustrated in FIGS. 1 and 2.

Figure 3D:
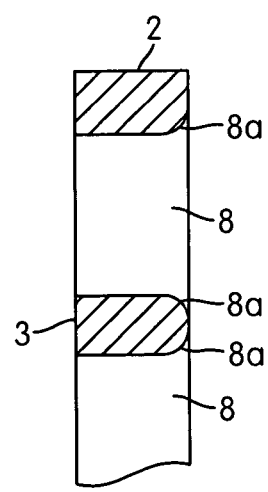
Figure 15:
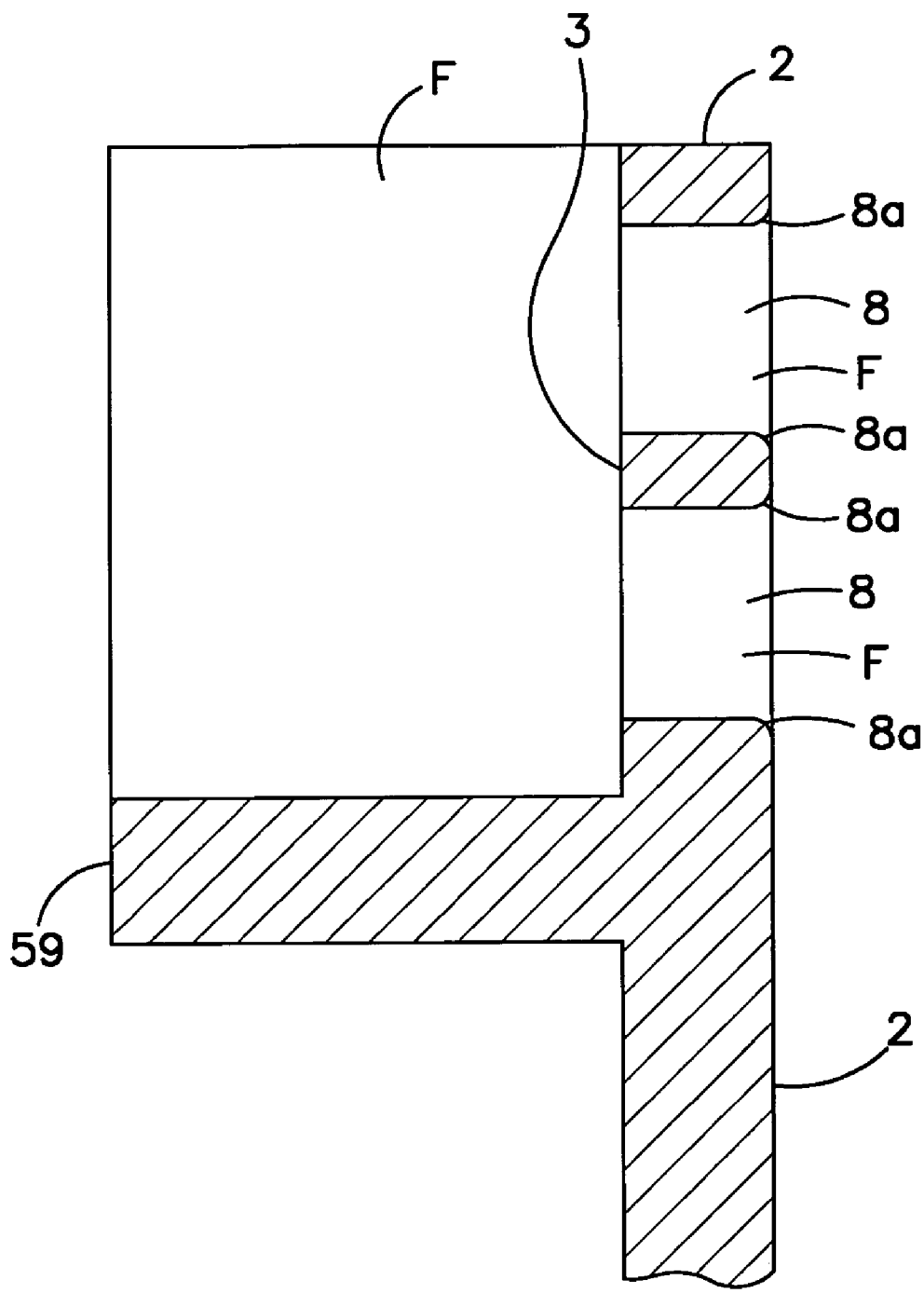
FIG. 15 is a cross-sectional view of a cavity filler in accordance with one embodiment of the invention, wherein holes having diameters that are smaller on one side of the plate-like base body than the other side of the plate-like base body are used to secure the foamable material onto the periphery of the plate-like base body.

Moreover, it is desirable for the small hole (8) to be larger in diameter in its cross-sectional shape on the back side (FIG. 2 side) of the holding part (3) of the base body (2) than on the holding part (3) side (FIG. 1 side) [FIG. 3(d)]. In other words, it is desirable to form at least a portion or preferably all the small holes (8) in such a way that they have an enlarged diameter part (8a) on the periphery of the open end on the back side (FIG. 2 side) of the holding part (3) [FIG. 3(d)]. In other words, the hole diameter preferably is smaller on the side of the holding part in contact with the foamable material (i.e., the side closest to or adjacent to the step part (4) of the holding jig). By forming the small holes (8) in this way, the foamable material (F) will be packed into the enlarged diameter part (8a) as well as into the small holes (8), when the foamable material (F) is packed and molded in the holding part (3); thus, the foamable material (F) packed in the enlarged diameter part (8a) works as an anchor or wedge, and the foamable material (F) increases its adhesion to the holding part (3), so that no mishap at all will occur, such as separation of the foamable material (F) from the holding jig (20). Furthermore, with small holes (8) of this kind, a mold for the holding jig (20) may be easily fabricated. This arrangement of holes may also be utilized for holding foamable material in place on other types of holding jigs. For example, the holding jig need not contain step part (4) but may instead comprise a plate-like base body having a plurality of holes around its periphery with a rim substantially perpendicular to the plane of the plate-like base body also positioned around the periphery of the plate-like base body, although set back from the outer edge of the plate-like base body so as to define a holding part in which the holes are located. The holes preferably are positioned between the outer edge of the plate-like base body and the rim, with the foamable material being placed on the same side of the plate-like base body as the rim. Preferably, the diameters of at least a portion of the holes on this side of the plate-like base body are smaller than the diameters of the corresponding holes on the other side. FIG. 15 illustrates such an embodiment in a cross-sectional view, wherein rim (59) provides a means of directing the foamable material (F) towards the walls of the cavity of the hollow structure in which the cavity filler is positioned as the foamable material expands in a manner analogous to that of the step part (4) utilized in other embodiments of the present invention.

Referring now to FIG. 1 again, a protruding part (5) is provided in the central area of the base body (2), and its peripheral edge wall forms a step part (4) of predetermined height (for example, about 2-30 mm), which supports the inner peripheral surface of the foamable material. This construction will make the step part (4) project in the form of a ring at the inner peripheral end of the holding part (3). The step part (4) assists in selectively directing the foamable material as it foams and expands generally towards the interior walls of the cavity of the hollow structure so that little if any of the foamable material expands towards the interior of the cavity, thereby making efficient use of the foamable material. Here, the protruding part (5) is a recessed part when seen from the back side (refer to FIG. 2). Protruding part (5) in a preferred embodiment does not contain any through holes.

An attaching means (6) or (26) to attach and fix the base body (2) to a hollow structure such as a pillar is provided at a predetermined location of the peripheral edge of the base body (2). The attaching means (6, 26) are so-called clips, and are not particularly limited to any specific ones, as long as they can accomplish attachment and fixation to the hollow structure. The attaching means (6) in FIGS. 1, 2, 5, and 6 is made attachable to the hollow structure with spring pieces (6a, 6a) provided on both sides, and also has a hollow part (7), so that the foamable material can be packed in this hollow part (7) as well when the foamable material is molded onto the holding jig, which will be described later. The attaching means (26) in FIGS. 3 and 7 is made attachable to the hollow structure with spring pieces (27, 27) provided on both sides, and also has pressing members (28, 28) above at an interval corresponding to the thickness of the hollow structure from the spring pieces (27, 27) on both sides, so that attachment to the hollow structure can be made stronger by pressing in direct contact with the inner wall side of the hollow structure with the pressing members (28, 28) upon attachment to the hollow structure with the two spring pieces (27, 27).

Furthermore, when there are one or more corners (Pc) (for example, refer to FIG. 9) in the transverse cross-sectional shape of the cavity of a hollow structure such as a pillar, extensions (9) are provided in the aforesaid base body (2), corresponding to the corners (Pc) of the cavity of the hollow structure. Approximately U-shaped foaming control walls (10a, 10b), that are made open at one or both ends in the longitudinal direction of the cavity and open toward said corners, are provided at the leading ends of said extension (9), in order to control the foam expanding direction of the foamable material (F).

The above-mentioned arrangement will be described with the foaming control wall (10a) as an example. As shown in FIGS. 3(c) and 4, an appropriately projected extension (9) is provided in the base body (2), and a U-shaped wall (11) with an opening (14) open toward the direction of the corner (Pc) is formed at the leading end of the extension. The U-shaped wall (11) is open at one or both ends in the longitudinal direction of the cavity; in the illustrated example, the side where the foamable material (F) is introduced into the space by molding (the same side as the holding part (3)) is open at the end, and the other end is closed by forming a bottom wall (12). Furthermore, when the U-shaped wall (11) is to be open at one end in the longitudinal direction of the cavity, it is undesirable to make the open end on the side where the foamable material is not molded (back side of the holding part (3)) and the closed end on the side where the foamable material is molded (the same side as the holding part (3)), because it becomes difficult to inject a foaming agent into the U-shaped wall (11) when the foamable material (F) is molded. Therefore, it is desirable to make the open end at least on the side where the foamable material (F) is molded (the same side as the holding part (3)).

Furthermore, although the above-mentioned example shows a case where the U-shaped wall (11) is open at one end in the longitudinal direction of the cavity, and closed at the other end by forming the bottom wall (12) [FIGS. 3(c) and 4], both ends in the longitudinal direction of the cavity may also be open (the bottom wall (12) not being present). The bottom wall (12) is present only out of consideration for stabilizing the shape by preventing the U shape from deforming when the material used to make the holding jig contracts by cooling and hardening when the U-shaped wall (11) is formed, and is not basically related to control in the foam expanding direction of the foamable material (F).

With the above-mentioned structure, the holding jigs (20, 20a) of the present invention have no parts that restrain foaming in the longitudinal direction of the cavity from both sides, and thus there are no parts that require undercutting; accordingly the mold costs less with no need for a slide core, and the number of molds being prepared can be increased. Furthermore, it has no parts such as projected rims, and is not designed to cover rims of this type with the foamable material; thus, the mold can be released or removed without waiting until the foamable material cools completely, which shortens the molding cycle and improves productivity.

The cavity fillers (22, 22a) of the present invention may be generated by molding the foamable material (F) into a solid shape in the holding parts (3) of the holding jigs (20, 20a) that have the above-mentioned structure. Injection molding techniques may be employed for this purpose. In other words, the holding jig (20) or (20a) is set in an injection molding mold and mold-fastened, and the foamable material (F) melted or softened and injected in liquefied or melted form into the cavity formed by the step part (4) and holding part (3) of the holding jig (20) or (20a) in the mold and solidified by cooling or other means such as cross-linking (FIG. 5-8). In this way, the foamable material (F) is packed even in the large number of small holes (8) [FIGS. 6 and 7(b)], and also in the spaces defined by the approximately U-shaped foaming control walls (10) [FIGS. 7(c) and 8]. This method will provide extremely high adhesion between the holding jig (20) or (20a) and the foamable material (F) and make them hard to separate. Accordingly, special members like holding pieces (retaining tacks) to attach the foamable material (F) to the holding jig (20) or special fabrication are unnecessary, which differs from the conventional technique, and thus contributes to weight reduction and cost reduction due to the decreased number of parts. Moreover, since there are no parts such as projected rims in the periphery of the holding jig (20, 20a), which differs from the conventional technique, there is no danger of the projected rims being deformed by molding pressure during fabrication, and an advantage can be offered in terms of stability of production, such as in the quality and yield.

The foamable material (F) is not particularly limited, as long as it has the property of foaming and expanding by application of external heating at about 140-210° C. (the typical temperatures encountered by an automobile body in the electrodeposition or baked finish process for an automobile) and can be formed into a solid shape. Preferably, the foamable material is comprised of at least one resin (e.g., a thermoplastic or thermosettable resin) and at least one latent foaming agent (e.g., a foaming agent that is stable at room temperature but is activated upon application of heat, such as latent chemical foaming agents as well as encapsulated physical blowing agents). Various foamable materials such as mixtures of urethane-, epoxy-, rubber-, or olefin-based heat-foaming materials and fillers (filler materials) can be used, and specific examples of such foamable materials include those disclosed in U.S. Pat. No. 5,160,465. Suitable foamable materials are also available commercially, such as, for example, the TEREPHON and TEROCORE products sold by Henkel KGaA and its affiliates and the ORB NV series of products sold by Orbseal, LLC.

The material from which the holding jig is fabricated is not particularly critical, provided it has sufficient rigidity, stiffness and strength to function effectively as a carrier for the foamable material. In particular, it should have sufficient heat resistance to withstand the heating that the cavity filler will normally encounter when the assembled vehicle containing the installed cavity filler is subjected to a paint cure oven. At the same time, the holding jig material should have good impact resistance at low temperatures, so that the holding jig does not readily crack when the vehicle containing the cavity filler is later exposed to winter conditions, for example.

Suitable materials for the holding jig thus include both metal and plastic, wherein the plastic may be thermoplastic or thermosetting. Metal holding jigs may be produced by stamping and/or forming techniques, for example. Injection molding will preferably be utilized to form plastic holding jigs. Illustrative plastics suitable for use include polyamides, especially reinforced polyamides such as fiber-reinforced polyamides.

Next, the process from the step of attaching the cavity filler for a hollow structure of the present invention to a cavity of a hollow structure to the step of the foamable material being packed in the cavity upon foaming and expanding by external heat will be explained with the use of FIGS. 9 and 10. FIG. 9 shows the state of a cavity filler of the present invention attached to a cavity of a hollow structure, (a) being a diagram to illustrate the attached state, and (b) being a cross-sectional view along line E-E. FIG. 10 shows the state of a cavity filler of the present invention foamed and expanded by external heat after being attached to a cavity of a hollow structure, (a) being a diagram to illustrate the foamed state, and (b) being a cross-sectional view along line G-G. Symbol (22a) indicates another example of a cavity filler of the present invention, shown in the aforesaid FIG. 7. Furthermore, the structure of a cavity filler (22a) of the present invention in FIGS. 9 and 10 is as mentioned previously, and thus its repetitive description will be omitted here.

A hollow structure such as a pillar consists of, for example, a set of side sheets (P1, P2), as shown in the figures, with a cavity (Pg) being formed by these side sheets (P1, P2). An attaching hole (H) is bored at a predetermined location of one side sheet (P2), so that the cavity filler (22a) of the present invention can be attached to the attaching hole (H). Specifically, the attaching means (26) in the cavity filler (22a) of the present invention is inserted in the attaching hole (H), and the two spring pieces (27, 27) are brought into contact with the outer wall side of the side sheet (P2) and the pressing members (28, 28) are brought into contact with the inner wall side of the side sheet (P2), to attach the filler. In this way, the cavity filler (22a) is attached in the cavity (Pg) of the hollow structure [FIG. 9(a)], and the foamable material (F) is supported and fixed with a predetermined gap from the side sheets (P1, P2) of the hollow structure [FIG. 9(b)]. Typically, the cavity filler is attached in the cavity of the hollow structure in a direction that is substantially perpendicular to the longitudinal direction of the cavity. Moreover, the foaming control walls (10a, 10b) of the cavity filler (22a) gets arranged in correspondence with the corners (Pc, Pc) of the cavity (Pg) of the hollow structure [FIG. 9(a)].

If the automobile body is heated from outside to about 140-210° C. in the electrodeposition or baked finish process of an automobile, after the cavity filler (22a) is attached in the cavity (Pg) of the hollow structure as mentioned above, the foamable material (F) foams and expands and fills in the transverse cross-sectional direction of the cavity (Pg) of the hollow structure [FIGS. 10(a),(b)]. In this case, because a large number of small holes (8) are present in a net or lattice pattern in the holding part (3) of the holding jig (20a) in the cavity filler (22a), the foamable material (F) foams and expands also through each of the large number of small holes (8); thus, the foaming expansion in the longitudinal direction of the cavity is not blocked, but because the heat-receiving efficiency of the foamable material (F) is high on both front and back sides of the cavity filler (22a), the foaming and expanding capacity of the foamable material (F) is enhanced, and the foaming expansion of the foamable material (F) can be fully promoted [FIG. 10(b)]. Furthermore, with the foaming control walls (10a, 10b) of the cavity filler (22a) arranged in correspondence with the corners (Pc, Pc) of the cavity (Pg) of the hollow structure, the foamable material (F) can be fully packed when expanded even in the corners (Pc, Pc) [FIG. 10(b)]. The entire gap between the cavity filler and the walls of the hollow structure thereby can be completely sealed in an efficient manner (e.g., with a reduced amount of foamable material as compared to conventional cavity fillers).

Figure 11A:
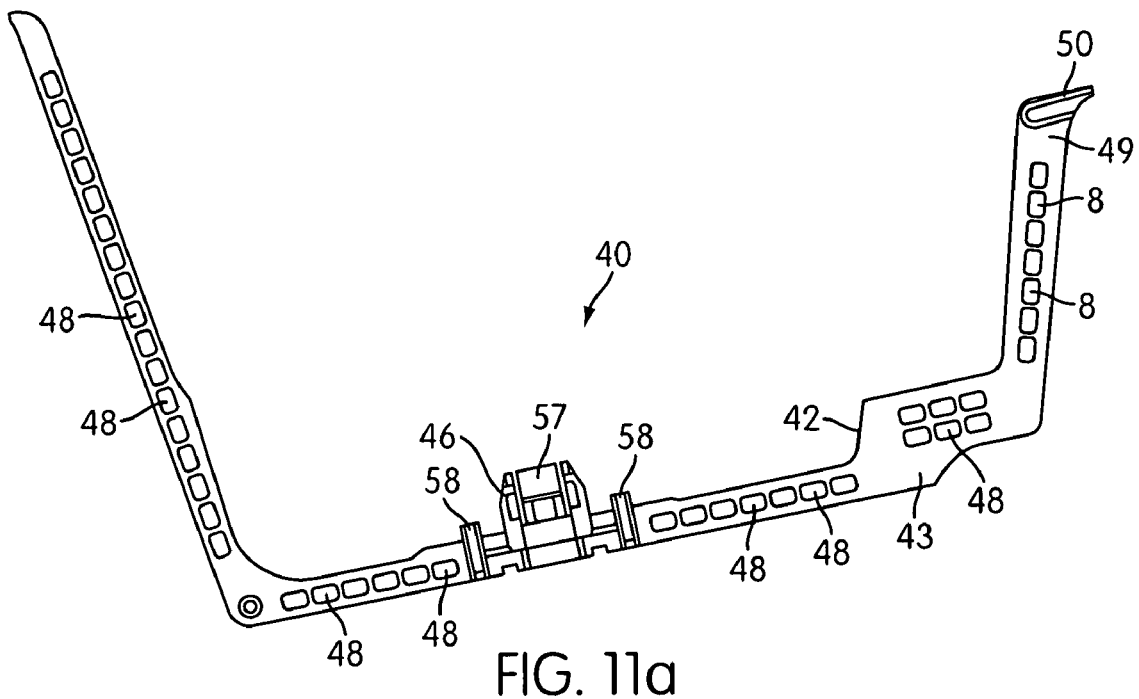
FIG. 11 presents diagrams of one example of an auxiliary holding jig in an auxiliary cavity filler of the present invention, (a) showing a top-view illustration, and (b) an illustration of the means to be attached seen from above.
Figure 11B:
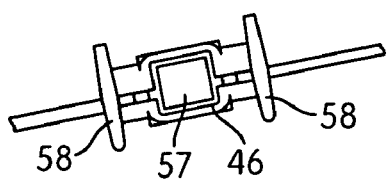
Figure 12A:
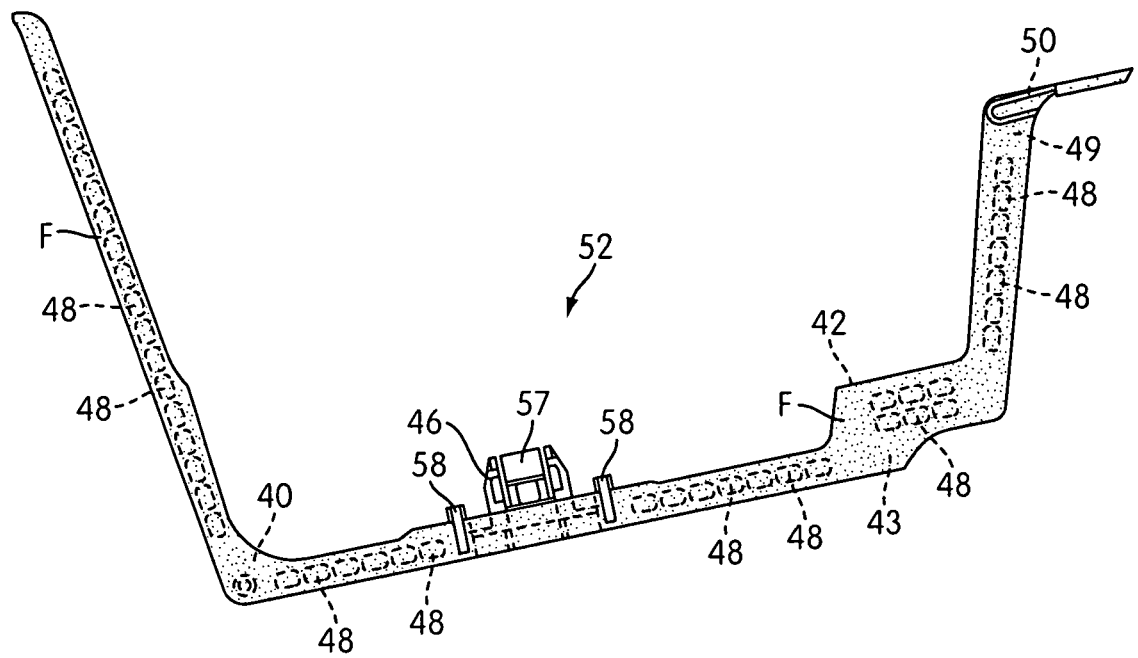
FIG. 12 presents diagrams of one example of an auxiliary cavity filler of the present invention, (a) showing a top-view illustration, and (b) an illustration of the means to be attached seen from above.
Figure 12B:
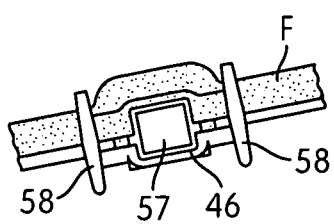
Figure 13:
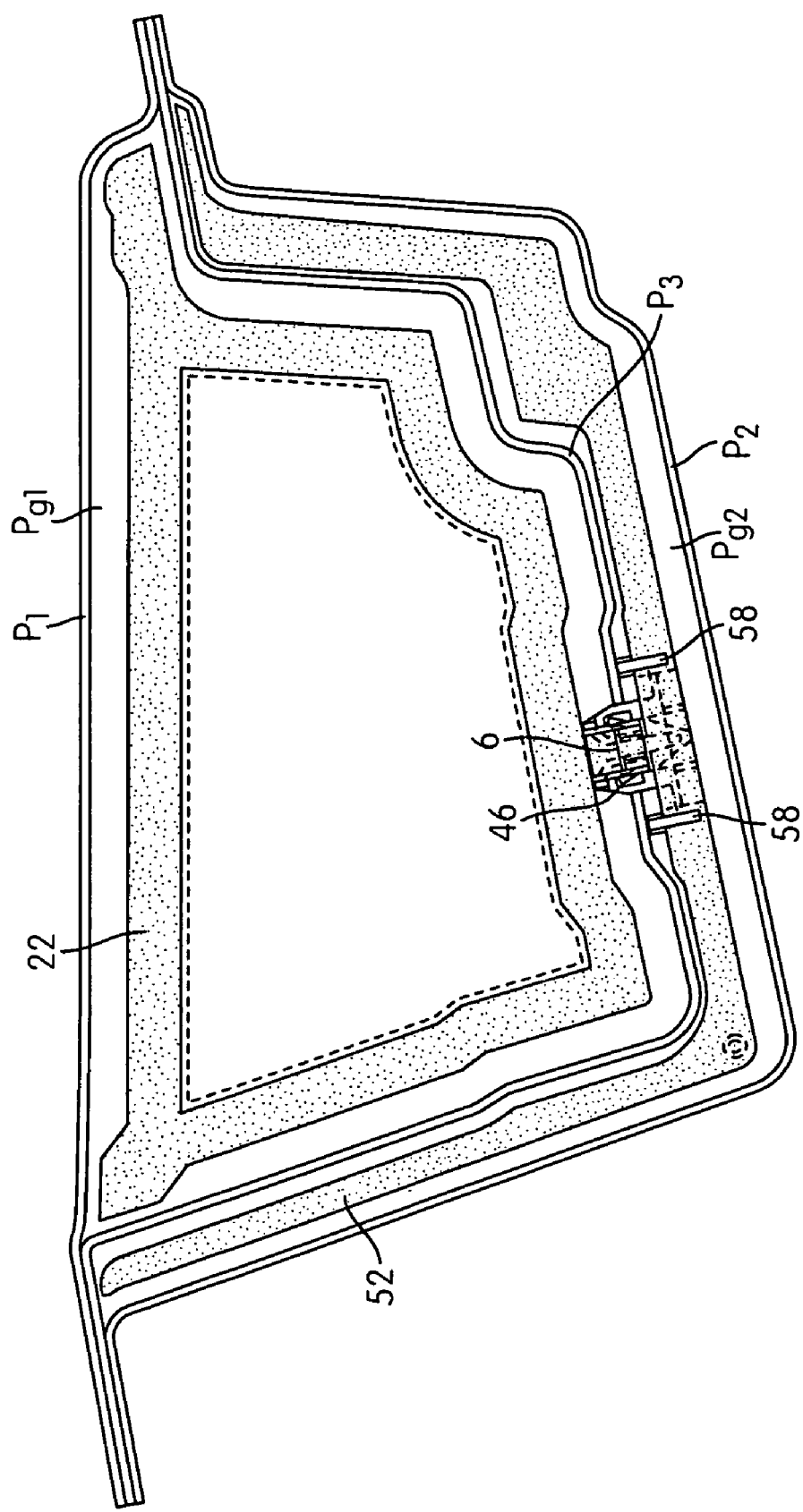
FIG. 13 is an illustration of the attached state, which shows the state of one embodiment of an auxiliary cavity filler of the present invention attached in the other compartment of the cavity of a hollow structure.

Next, the auxiliary cavity filler of the present invention will be explained with the use of FIGS. 11-13. FIG. 11 shows one example of an auxiliary holding jig for the auxiliary cavity filler of the present invention, (a) being a top-view illustration and (b) being an illustration of a means to be attached seen from above. FIG. 12 shows one example of an auxiliary cavity filler of the present invention, (a) being a top-view illustration, and (b) being an illustration of a means to be attached seen from above. FIG. 13 is an attached state illustration that shows the state of an auxiliary cavity filler of the present invention being attached in another compartment of the cavity of a hollow structure. In the figures, symbol (40) represents the auxiliary holding jig and symbol (52) the auxiliary cavity filler.

When the cavity (Pg) of the hollow structure is divided into two compartments with a partition (P3) (refer to FIG. 13), an auxiliary cavity filler (52) of the present invention is used by being attached in the other compartment (Pg2) when an aforesaid cavity filler of the present invention is attached in one compartment (Pg1). Accordingly, there is no need to proceed in this way, particularly if the cavity of the hollow structure is not divided into two compartments with a partition (P3).

The auxiliary holding jig (40) to be used in the auxiliary cavity filler (52) of the present invention is provided with a plate-like auxiliary base body (42), and this auxiliary base body (42) is made smaller in diameter than the transverse cross-sectional diameter of the cavity of the other compartment (P2g). The material of the auxiliary base body (42) may be similar to that of the aforementioned base body (2).

The auxiliary base body (42) is provided with an auxiliary holding part (43) to support one side of a foamable material (F) on its one side. Usually, the cavity of the other compartment (Pg2) when the hollow structure is divided into two compartments with a partition (P3) is a long and narrow space in many cases (FIG. 13); thus, the auxiliary base body (42) is also a long and narrow plate-like member, and the auxiliary holding part (43) is formed over nearly all the surface of one side of the auxiliary base body (42) (FIG. 11).

A large number of small holes (48) are bored in the auxiliary holding part (43) that extend from one side of the auxiliary base body (42) to the other side, and in a similar manner for the aforementioned holding part (3) (FIG. 11). The shape and size of the small holes (48) are similar to those of the aforementioned small holes (8).

In the auxiliary base body (42) is formed a means to be attached (46), and this means to be attached (46) is not a member to be directly attached to the hollow structure, but is to be attached and fixed to the attaching means (6) of the aforementioned cavity filler (22) (FIG. 13) with the partition (P3) being interposed. In other words, the means to be attached (46) may comprise a receiving hole (57) in which the attaching means (6) of the cavity filler (22) is inserted, and pressing members (58, 58) placed upright on both sides of said hole, and is attached by inserting the attaching means (6) of the cavity filler (22) in the receiving hole (57) and pressing the side wall of the other compartment (Pg2) of the partition (P3) with the pressing members (58, 58), while the partition (P3) is interposed [while the cavity filler (22) is in one compartment (Pg1) and the auxiliary cavity filler (52) is in other compartment (Pg2)] (FIG. 13).

An auxiliary cavity filler (52) of the present invention is generated for the auxiliary holding jig (40) with the above-mentioned structure by molding the foamable material (F) into a solid shape in the auxiliary holding part (43) of said jig (FIG. 12). The methods of molding the foamable material (F), etc., are similar to those for the aforementioned cavity filler (22).

Furthermore, when there is a corner (Pc) in the other compartment (Pg2), the auxiliary holding part (43) may be provided with an extension (49) in the auxiliary base body (42), corresponding to the corner (Pc) in the other compartment (Pg2), and provided with an approximately U-shaped foaming control wall (50) at the leading end of said extension (49), which is made open at one or both ends in the longitudinal direction of the cavity and open toward said corner [FIGS. 11(*a*) and 12(*a*)]. The structure of the foaming control wall (50), etc., is similar to that of the aforementioned foaming control wall (10).

By using an auxiliary cavity filler (52) in this way, an auxiliary cavity filler (52) can be placed in the other compartment (Pg2) of the cavity at the same time as a cavity filler (22) is placed in one compartment (Pg1) of the cavity, even when the cavity of the hollow structure is divided into two compartments with a partition (3); therefore, both the one compartment (Pg1) and other compartment (Pg2) of the cavity can be simultaneously packed with the foamable material (F) upon activation and expansion of the foamable material.

What is claimed is:

1. A cavity filler for a hollow structure, comprising:
   a) a holding jig comprising a plate-like base body having a front side with a periphery, a back side with a periphery, a planar holding part that is provided in a predetermined width in the form of a ring on the periphery of one of said front and back sides of said base body, said planar holding part extending from the periphery of the one of said front and back sides of said plate-like base body to an inner peripheral end of the planar holding part, a step part of predetermined height that protrudes in the form of a ring at the inner peripheral end of said planar holding part, and an attaching means to attach and fix said plate-like base body, wherein said planar holding part contains a plurality of holes that are open from the front side to the back side of the planar holding part in a net or lattice pattern; and
   b) a portion of a foamable material positioned in the planar holding part of the holding jig, wherein foamable material is molded and packed into at least a portion of the holes so as to hold the portion of foamable material in place on the holding jig, the planar holding part supports one side of the portion of foamable material, and the step part supports an inner peripheral surface of the portion of foamable material and is configured to assist in selectively directing the portion of foamable material as the foamable material foams and expands generally towards interior walls of a cavity of the hollow structure.

2. The cavity filler of claim 1, wherein said plate-like base body is provided with one or more extensions, each extension projecting from the plate-like base body to a leading end of said extension, and with approximately U-shaped foaming control walls at the leading ends of said extensions, forming an approximately U-shaped space that is filled with foamable material.

3. The cavity filler of claim 1, wherein at least a portion of said holes have a smaller diameter on one side of said planar holding part than on an opposite side of said holding part, wherein the portion of foamable material is supported on the side of said planar holding part having smaller diameter holes.

4. A cavity filler for a hollow structure having one or more corners, comprising:
   a) a holding jig comprising a plate-like base body and an attaching means to attach and fix the plate-like base body to a hollow structure, wherein the plate-like base body is provided with one or more extensions, each extension projecting from the plate-like base body to a leading end of said extension, and with approximately U-shaped foaming control walls transverse to the plate-like base body at the leading ends of said extensions and defining spaces, wherein each space is open towards a corner of the hollow structure when the cavity filler is fixed in the hollow structure; and
   b) a foamable material, wherein the spaces are filled with said foamable material and are configured to serve as reservoirs of said foamable material that are available for expansion generally selectively in the direction of the corners of the hollow structure.

5. The cavity filler of claim 4, wherein said foamable material additionally extends around the periphery of said plate-like base body.

6. The cavity filler of claim 4, wherein said approximately U-shaped foaming control walls further comprise a bottom wall.

7. The cavity filler of claim 1, wherein said holes are about 1-15 mm in diameter and/or at least about 25% of the planar holding part is open in the form of holes.

8. The cavity filler of claim 4, wherein the plate-like base body has a planar holding part around a periphery of the plate-like base body having a plurality of holes and wherein at least one of said holes has a first diameter opening on the one side of the planar holding part and a second diameter opening on the opposite side of the planar holding part such that the first diameter opening is smaller than the second diameter opening.

9. A cavity filler, comprising:
   i) a portion of a foamable material; and
   ii) a holding jig comprising:
     a plate-like base body having a front side, a back side and a periphery;
     an attaching means to attach and fix said base body; and
     at least one additional feature or combination of features selected from the group consisting of:
     a) a planar holding part that is provided in a predetermined width in the form of a ring on the periphery of said plate-like base body in one of said front and back sides, said planar holding part extending from the periphery of said plate-like base body inward to a step part of predetermined height that protrudes in the form of a ring from said planar holding part and that supports an inner peripheral surface of the portion of the foamable material and is configured to assist in selectively directing the portion of foamable material as the foamable material foams and expands generally towards interior walls of a cavity of the hollow structure, wherein said planar holding part contains a plurality of holes that are open from the front side to the back side of the planar holding part such that at least about 25% of the planar holding part of the base body is open in the form of holes, wherein at least a portion of the holes are filled with foamable material; or b) one or more extensions in the base body to correspond to corners of a cavity of a hollow structure, said extensions projecting outward in a plane with the base body and terminating in leading ends, at least one of said leading ends comprising an approximately U-shaped control wall transverse to said plane, said control wall defining a space for foamable material and said space being filled with foamable material and configured to serve as a reservoir of said foamable material that is available for expansion generally selectively in the direction of a corner of the hollow structure.

10. The cavity filler of claim 9, wherein said plurality of holes are in a net or lattice pattern.

11. The cavity filler of claim 10, wherein said holes are about 1-15 mm in diameter.

12. The cavity filler of claim 9, wherein said approximately U-shaped foaming control walls further comprise a bottom wall.

13. The cavity filler of claim 9, wherein said holding jig further comprises at least one of the following features:
 a. said holding jig has no parts that restrain foaming in a longitudinal direction of a cavity from both sides;
 b. said holding jig has no parts that require undercutting; or
 c. said holding jig has no projected rims in the periphery of said plate-like base body.

* * * * *